(12) United States Patent
Edney et al.

(10) Patent No.: US 7,574,253 B2
(45) Date of Patent: Aug. 11, 2009

(54) SIGNAL PROCESSING USING NON-LINEAR REGRESSION WITH A SINUSOIDAL MODEL

(75) Inventors: Paul A. Edney, Evanston, IL (US); Joseph T. Walsh, Jr., Evanston, IL (US)

(73) Assignee: Northwestern University, Evanston, IL (US)

( * ) Notice: Subject to any disclaimer, the term of this patent is extended or adjusted under 35 U.S.C. 154(b) by 1020 days.

(21) Appl. No.: 10/672,863

(22) Filed: Sep. 26, 2003

(65) Prior Publication Data

US 2005/0070791 A1     Mar. 31, 2005

(51) Int. Cl.
*A61B 6/00*     (2006.01)

(52) U.S. Cl. .................. 600/476; 600/407; 600/408; 600/425; 600/473; 382/128; 382/130; 382/131; 382/132; 702/66; 702/70; 702/71; 702/75; 702/76

(58) Field of Classification Search .............. 600/476, 600/407; 382/128, 130–132; 702/66, 70, 702/71, 75, 76
See application file for complete search history.

(56) References Cited

U.S. PATENT DOCUMENTS 7,202,941 B2 *   4/2007   Munro ............... 356/5.01
2002/0100864 A1 *   8/2002   Wake ............... 250/208.1

OTHER PUBLICATIONS

Slepicka et al., Stabilized Non-Linear Regression for Interferogram Analysis, Aug. 10, 1995, Applied Optics, vol. 34, No. 23, pp. 5039-5044.*

* cited by examiner

*Primary Examiner*—Brian Casler
*Assistant Examiner*—James Kish
(74) *Attorney, Agent, or Firm*—McAndrews, Held & Malloy, Ltd.

(57) ABSTRACT

A method for processing signals, such as a tomography signal, in the time domain provides both high spatial resolution and high frequency resolution but at low cost. The method uses non-linear regression with a sinusoidal model to fit a sine wave to a portion of the signal that is less than a full cycle of a wave of the signal.

18 Claims, 2 Drawing Sheets unfiltered median-filtered thresholded normalized

SIGNAL PROCESSING USING NON-LINEAR REGRESSION WITH A SINUSOIDAL MODEL

STATEMENT REGARDING FEDERALLY SPONSORED RESEARCH OR DEVELOPMENT

This work was supported by the National Science Foundation under Grant No. BES-9813959.

CROSS-REFERENCE TO RELATED APPLICATIONS

1. Technical Field

The present invention is directed to a method of processing a signal, for example an optical coherence tomography signal, in the time domain and more particularly to such a signal processing method using non-linear regression with a sinusoidal model.

2. Background of the Invention

There are a number of known techniques for imaging tissue including ultrasound tomography and optical coherence tomography. In ultrasound tomography, a sound wave is launched into tissue where it is reflected off of interfaces, the sound energy returning to a detector. These interfaces are places where characteristics of the sound energy changes. The intensity of the returning signal is plotted as a function of time, where the time axis is transformed into a depth axis using the knowledge of the approximate speed of sound in the tissue to obtain an intensity profile as a function of depth. The plot of intensity as a function of depth along a particular lateral location is known as an A-scan. From a collection of A-scans, each obtained from neighboring lateral locations, an image depicting intensity as a function of lateral position and depth can be obtained. Such an image is called a B-scan and is commonly used in obstetrics to analyze a growing fetus, in cardiology, in neonatal encephalogy and in certain aspects of internal medicine.

In optical coherence tomography, an optical wave is launched into tissue where it is reflected off of interfaces, the optical energy returning to a detector. The interfaces are places where the characteristics of the light, e.g., the complex index of refraction, changes. The intensity of the returning signal is plotted as a function of time, where the time axis is transformed into a depth axis using the knowledge of the approximate index of refraction in the tissue to obtain an intensity profile as a function of depth. A plot of the intensity as a function of depth along a particular lateral location is known as an A-scan. The major differences between ultrasound tomography and optical coherence tomography relate to the differences between sound and light. Sound is slower than light. Thus, in ultrasound tomography, to develop the image, the time between the emission of sound from the source and the time when the returning sound energy is collected by the detector can be measured using a clock. Because light travels so quickly, an interference technique is used to measure time. Thus, optical coherence tomography is based upon an interferometer. From a collection of the A-scans obtained via optical coherence tomography, where each A-scan is obtained from neighboring lateral locations, an image can be generated depicting intensity as a function of lateral position and depth. Again, such an image is called a B-scan. With known ultrasound tomography systems, the scan can interrogate on the order of 10 cm into tissue with a spatial resolution of approximately 100 μm. With prior optical coherence tomography systems, the scan can interrogate on the order of 4 mm into the tissue with a spatial resolution of approximately 1 μm. The depth and resolution of both imaging techniques are dependent on the source, detector, and signal processing employed.

The optical coherence tomography signal is typically processed in the frequency domain. However, the frequency domain is limited by the inverse duality of spatial resolution and frequency resolution. Specifically, the finer the spatial detail obtained, the coarser the frequency detail obtained and vice versa. Thus, with processing in the frequency domain, one cannot obtain both the high spatial resolution needed to see small vessels and the small frequency shifts needed to quantify the low fluid velocities in such vessels. In order to overcome this problem, known optical coherence tomography method have averaged a large number of A-scans, which requires expensive technology.

BRIEF SUMMARY OF THE INVENTION

In accordance with the present invention, the disadvantages of prior signal processing techniques for processing signals such as an optical coherence tomography signal, have been overcome. With the method of the present invention, both high spatial resolution and high frequency resolution are obtained with less sophisticated instrumentation so as to provide a lower cost system and method. Although, the invention is described below for processing an optical coherence tomography (OCT) signal, the method of the present invention is not limited thereto. The method is applicable to the processing of other signals where the frequency of the signal is in a known range.

More particularly, the method of the present invention includes digitizing the signal to be processed to provide digital data points. The digital data points, representing a portion of the signal, are processed using non-linear regression with a sinusoidal model optimized for a known frequency range. The parameters or coefficients of the sine wave fit to the digital data points provide the information for which the signal is processed. Specifically, in one embodiment of the present invention, the parameters or coefficients are used to generate high resolution A-scan and B-scan images depicting fluid flow. In addition to information relating to the velocity of fluid flow, shear rate information is obtained as well.

In one embodiment of the present invention, the digital data points that are processed represent a portion of the signal that is less than a full cycle of a wave of the signal. As a result, higher spatial resolution is obtained. In accordance with the processing method of the present invention, a single A-scan can provide good images. The quality of the images can be improved by using only a few overlapping A-scans as opposed to averaging of a large number of A-scans as in the prior art. Thus, with the method of the present invention, turbulent flow in small vessels can be imaged from data collected in a short period of time.

These and other advantages and novel features of the present invention, as well as details of an illustrated embodiment thereof, will be more fully understood from the following description and drawings.

DETAILED DESCRIPTION OF THE INVENTION

The signal processing system of the present invention focuses on a small section of a complex signal, such as an OCT signal, and models this small section of the signal as a single sine wave for time domain processing. This is opposed to prior methods using frequency domain processing of OCT signals that sample multiple sine waves of multiple frequencies, amplitudes, and phases. The time domain processing method of the present invention is described in detail below for an OCT signal, but the method is not limited thereto. The signal processing method of the present invention can be used for signals, the frequency of which is known within a given range. The size of the frequency range, within which the frequency sought is known to be, varies depending on the signal to noise ratio such that the higher the signal to noise ratio, the greater the frequency range can be.

Figure 1:
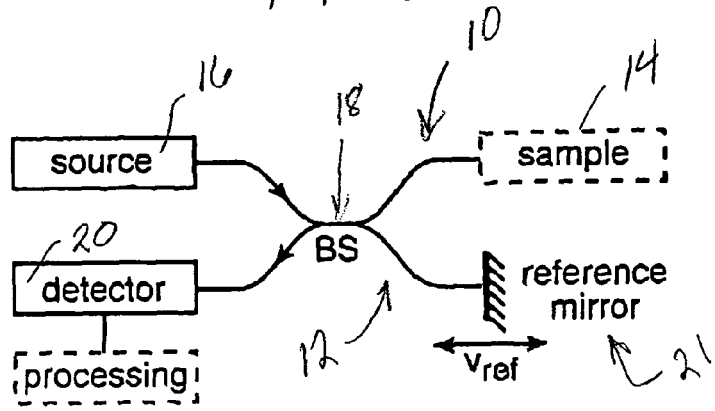
FIG. 1 is a block diagram illustrating an OCT system providing a signal for processing in accordance with the present invention.

An OCT system that generates the OCT signal to be processed as shown in FIG. 1 is based on a Michelson interferometer. The interferometer includes a sample arm 10 and a reference arm 12. Light in the sample arm is reflected by the interfaces in the tissue sample 14 and interferes with the light in the reference arm 12. When the optical path lengths of the reference and sample arms are equal to within the coherence length of the source 16, an interference signal is produced. The coherence of the light source acts as a spatial or temporal gate that allows the reference arm to be used for ranging and slice-selection. Signals that are not within the temporal gate are detected as a mean background intensity that can be filtered out by an AC-coupled detector.

The source 16 may include super luminescent diodes centered near $\lambda_0 = 1.3$ μm so as to maximize light penetration in the tissue sample. However, any broadband light source can be used. The light from the source is input to a single mode optical fiber wherein a fiber optic 50:50 beam splitter 18 directs half of the light to the reference arm 12 and half of the light to the sample arm 10. In both arms 10 and 12, light exiting the optical fibers is collimated by Faraday rotators. The collimated light in the reference arm is reflected back into the optical fiber by a retro-reflective prism 21 that is mounted either on a galvanometer or on a micro-translation stage. Translation of the retro-reflector 21 at a known velocity provides axial scanning as well as a means to modulate the OCT signal at a known, Doppler-induced carrier frequency $f_{ref}$. Light in the sample arm 10 is steered by a galvanometer-based xy-scanner and is focused onto the tissue sample by fixed achromats.

Light reflected by the reference reflector 21 and light reflected by the tissue sample 14 travels back to the beam splitter 18 and from there to a high sensitivity photoreceiver or detector 20. The photoreceiver or detector 20 converts the received optical signals to electrical signals. Within the detector 20 the signal is amplified and filtered. For demodulation based OCT, the signal from the detector 20 is processed by a lock-in amplifier tuned to the Doppler-induced carrier frequency of the signal. A time constant of 30 μs was found to be optimal for OCT signals. Amplitude and phase outputs are then sent to a digital acquisition board. For A-scan based OCT processing, the signals from the detector 20 are pre-amplified, filtered by an analog 8-pole low pass Bessel filter and post amplified. The amplified A-scan signal is then sent to the digital acquisition board. Data acquisition may be performed with a 16 byte PCI board from Gage CompuScope 1610. For demodulation based OCT, amplitude and phase from the lock-in amplifier are acquired through separate channels. For the A-scan based processing, the amplified signal from the detector 20 is acquired through a single channel. In both of these modes, the position feedback signal from the reference arm is passed to the trigger input of the data acquisition board.

The signal from the detector 20 is digitized by an analog to digital converter of the data acquisition board. The digitized signal is then processed with a bi-directional filter. This type of filtering offers zero phase lag by first passing the signal forward through the filter and then backward therethrough, canceling out phase delays. For each pass, a third order elliptical bandpass filter is used. The filtered digital A-scan data is then processed in the time domain with sinusoidal models as follows.

In accordance with the present invention, it is recognized that the OCT signal is locally a sinusoid. That is, over a small portion of a cycle of the OCT signal, the signal is sinusoidal. A non-linear sinusoidal model for a portion of the OCT signal is:

$$I(t) = A \sin(2\pi f_0 t + \phi_0)$$

where A is the amplitude of the envelope, I is the intensity of the OCT signal, $f_0$ is the frequency of the signal, and $\phi_0$ is the phase lag. For a normalized A-scan where A=1, the sinusoidal model is in the form of:

$$I(t) = \sin(2\rho f_0 t + \phi_0).$$

The frequency to be determined by the processing is related to the known reference frequency, $f_{ref}$, and flow-induced Doppler shifts, $\Delta f_{flow}$, as follows:

$$f_0 = f_{ref} + \Delta f_{flow}$$

where $f_{ref}$ is determined by the reference arm scanning velocity, $V_{ref}$.

Figure 2:
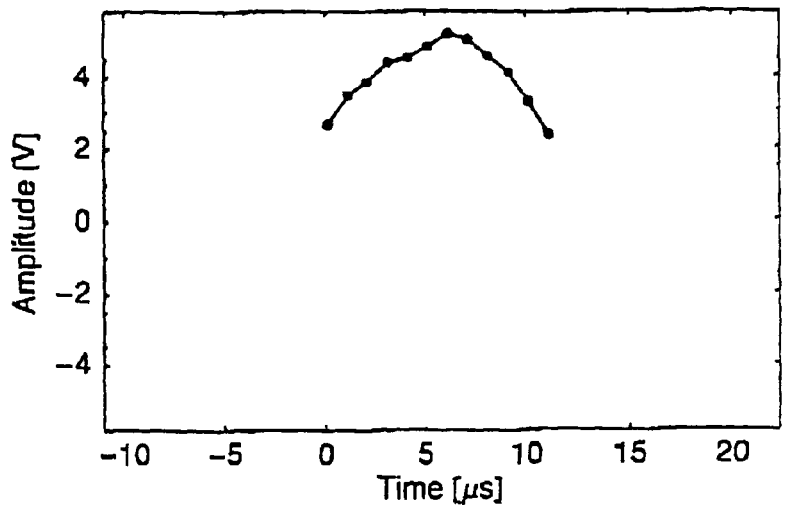
FIG. 2 is a graph illustrating digital data points of a noisy sine wave.

The amplitude A, frequency $f_0$ and phase lag $\phi_0$ are determined by non-linear regression using the sinusoidal model noted above. FIG. 2 illustrates twelve data points that span one-third of the signal's period. In this example, the signal to noise ratio is 30 dB. These digital data points are processed using non-linear regression with the sinusoidal model above so as to fit a sinusoid to the data. The non-linear regression is implemented in software as follows:

NonlinearRegress[data, a Sin[2 Pi ft+\[Phi]], {t}, {{a, a0}, [f, f0}, {\[Phi], \[Phi]0}}, RegressionReport->{BestFitParameters, ParameterCITable}]

The regression yields model parameters that are best fit to the twelve data points as follows with corresponding error estimates and a 95% confidence value.

$$5.03214 \sin(0.505818 + 188498t).$$

Figure 3:
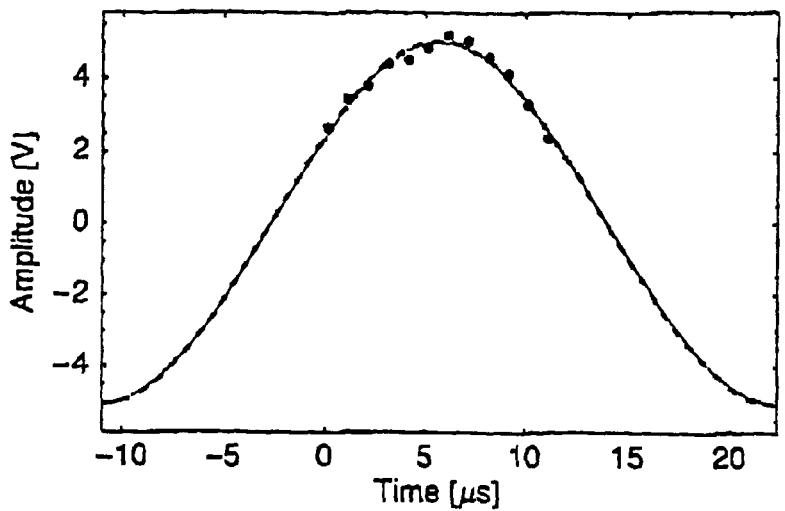
FIG. 3 is a graph illustrating a sine wave fit to the digital data points of FIG. 2 in accordance with the present invention.

Thus, the non-linear regression determines the frequency $f_0$ while avoiding the constraints of Fourier analysis. FIG. 3 illustrates the fit of the sinusoid to the digital data. depicted in FIG. 2.

In another embodiment of the present invention, the sinusoidal model is expanded to include changes in amplitude and shear rate as well. The expanded sinusoidal model is as follows:

$$I(t)=(A+\alpha t)\sin(2\pi(f_0+\sigma t)t+\phi_0)$$

where the additional parameters $\alpha$ and $\sigma$ model changes in amplitude and the rate of change of the frequency respectively.

The parameters or coefficients of the sinusoidal models discussed above are determined by non-linear regression or optimization with trust-region algorithms optimized for a known frequency range, by seeding the algorithm with the known frequency $f_{ref}$. From the determined parameters or coefficients of the sinusoidal model, an image can be obtained depicting turbulent flow in small vessels. The determined frequency of the signal provides information relating to the velocity of blood flow at a certain point within the tissue and the parameter $\sigma$ provides information as to the shear rate at that point for an OCT signal. The image can be improved by applying a median filter to each axial profile computed with the extended model. A median velocity image can be computed from only 16 B-scans. Averaging multiple B-scans increases the signal to noise ratio of the velocity image. Although as many as 16 B-scans can be used, small vessels are visible when as few as 3 B-scans are averaged.

Figure 4:
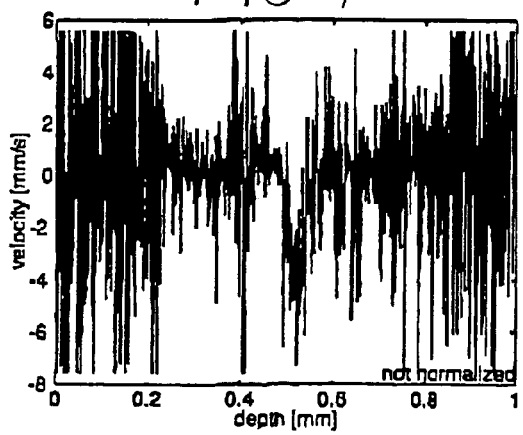
FIG. 4 is a plot of velocity versus depth obtained with the sinusoidal model of the present invention and no filtering.
Figure 5:
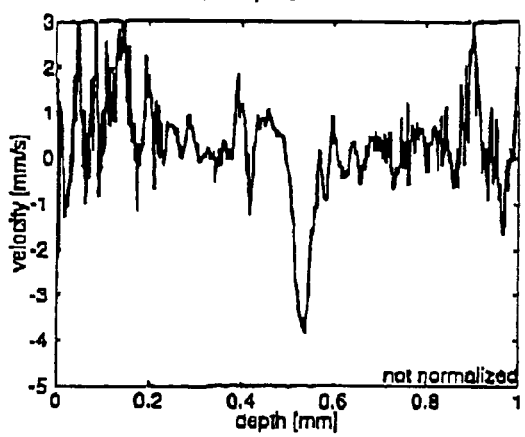
FIG. 5 is a plot of velocity versus depth obtained with the sinusoidal model of the present invention with median filtering.
Figure 6:
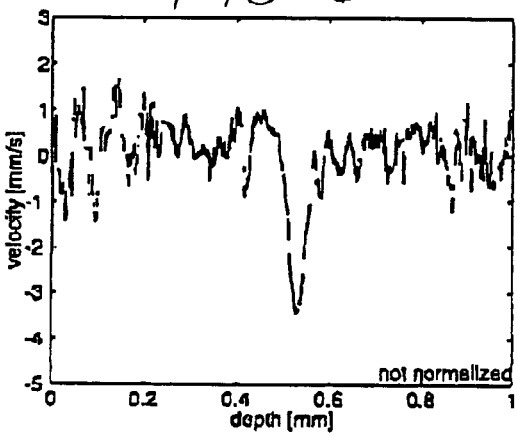
FIG. 6 a plot of velocity versus depth obtained with the sinusoidal model of the present invention with the removal of points that have failed to converge accurately.
Figure 7:
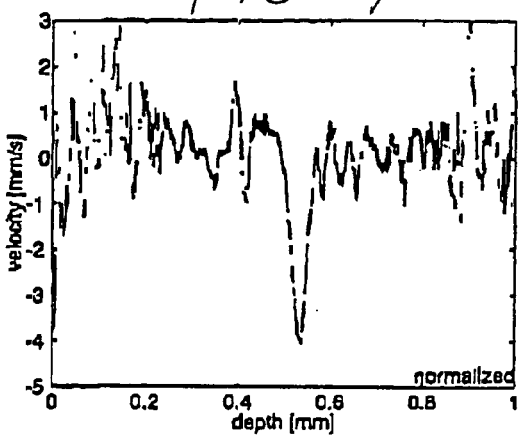
FIG. 7 a plot of velocity versus depth obtained with a normalized sinusoidal model of the present invention.

FIG. 4 depicts velocity as a function of depth obtained from an OCT signal processed in accordance with the time domain method of the present invention providing an unfiltered A-scan. A-scans obtained with the method of the present invention are filtered using median filtering with a window spanning a coherence length $l_c$ to smooth the velocity profile. The median filtered velocity profile is depicted in FIG. 5. By removing those measurements that do not converge correctly, i.e., that are equal to the bounds specified in the trust-region optimization, noise is further reduced and results in a velocity profile depicted in FIG. 6 which is similar to that obtained by frequency-domain processing but which has a higher resolution. Processing using a normalized sinusoidal model yields a similar velocity profile as depicted in FIG. 7.

The method of the present invention provides high quality OCT images while being simpler and less expensive to implement. The signal processing method can be used to process other types of signals that locally are a sinusoid where the frequency is known within a given range. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. An optical coherence tomography method using an optical coherence tomography system having a light source, a detector, an analog to digital converter and a processor comprising:
   generating an optical coherence tomography signal using the light source and the detector;
   digitizing the optical coherence tomography signal to provide digital data points; and
   processing the digital data points representing a portion of the signal in the time domain using non-linear regression with a sinusoidal model to fit the sinusoidal model to the digital data points.

2. A method as recited in claim 1 wherein the sinusoidal model is:

$$I(t)=A\sin(2\pi f_0 t+\phi_0)$$

where I is the intensity of the optical coherence tomography signal, A is the amplitude, $f_0$ is the frequency of the signal and $\phi_0$ is the phase lag.

3. A method as recited in claim 1 wherein the sinusoidal model is:

$$I(t)=(A+\alpha t)\sin(2\pi(f_0+\sigma t)t+\phi_0)$$

where I is the intensity of the optical coherence tomography signal, A is the amplitude, $f_0$ is the frequency of the signal, $\phi_0$ is the phase lag, $\alpha$ models changes in amplitude and $\sigma$ models a rate of change of frequency.

4. A method as recited in claim 1 wherein the non-linear regression is optimized for a known frequency range.

5. A method as recited in claim 1 wherein the processing determines the coefficients of the sinusoidal model including amplitude and frequency.

6. A method as recited in claim 5 wherein the processing eliminates components that fail to converge correctly.

7. A method as recited in claim 1 wherein the digital data points represent a portion of the signal that is less than a full cycle of a wave of the signal.

8. An optical coherence tomography method using an optical coherence tomography system having a light source, a detector, an analog to digital converter and a processor comprising:
   generating, using the light source and the detector, an image signal representing an image of materials that are changing or moving during imaging;
   receiving digital data points representing a portion of the image signal;
   processing the digital data points in the time domain by non-linear fitting of a sinusoidal model to the digital data to determine a frequency of the signal,
   wherein the digital data points represent a portion of the signal that is less than a full cycle of a wave of the signal.

9. A method as recited in claim 8 wherein the frequency of the signal is within a known frequency range.

10. A method as recited in claim 9 wherein the processing is optimized for the known frequency range.

11. A method as recited in claim 8 wherein the sinusoidal model is $$I(t)=A\sin(2\pi f_0 t+\phi_0)$$

where I is the intensity of the optical coherence tomography signal, A is the amplitude, $f_0$ is the frequency of the signal and $\phi_0$ is the phase lag.

12. A method as recited in claim 8 wherein the sinusoidal model is:

$$I(t)=(A+\alpha t)\sin(2\pi(f_0+\sigma t)t+\phi_0)$$

where I is the intensity of the optical coherence tomography signal, A is the amplitude, $f_0$ is the frequency of the signal, $\phi_0$ is the phase lag, $\alpha$ models changes in amplitude and $\sigma$ models a rate of change of frequency.

13. A method as recited in claim 8 wherein the processing eliminates components that fail to converge correctly.

14. A method of processing an optical coherence tomography signal in the time domain to determine a frequency of the signal where the frequency is within a known range using a system having an analog to digital converter and a processor comprising:
   digitizing the signal to provide digital data points; and
   processing the digital data points representing a portion of the signal in the time domain using non-linear regression with a sinusoidal model optimized for the known frequency range to determine parameters of the sinusoid fitting the digital data, the parameters including frequency, wherein the digital data points represent a portion of the signal that is less than a full cycle of a wave of the signal.

15. A method as recited in claim 14 wherein the processing eliminates components that fail to converge correctly.

16. A method as recited in claim 14 wherein the sinusoidal model is $$I(t) = A\sin(2\pi f_0 t + \phi_0)$$

where I is the intensity of the optical coherence tomography signal, A is the amplitude, $f_0$ is the frequency of the signal and $\phi_0$ is the phase lag.

17. A method as recited in claim 14 wherein the sinusoidal model is:

$$I(t) = (A+\alpha t)\sin(2\pi(f_0+\sigma t)t + \phi_0)$$

where I is the intensity of the optical coherence tomography signal, A is the amplitude, $f_0$ is the frequency of the signal, $\phi_0$ is the phase lag, $\alpha$ models changes in amplitude and $\sigma$ models a rate of change of frequency.

18. A method as recited in claim 14 wherein the parameters include amplitude and a rate of change of frequency.

* * * * *